United States Patent
Kim

(10) Patent No.: US 8,880,412 B2
(45) Date of Patent: Nov. 4, 2014

(54) METHOD TO SELECT ACTIVE CHANNELS IN AUDIO MIXING FOR MULTI-PARTY TELECONFERENCING

(75) Inventor: Doh-Suk Kim, Cupertino, CA (US)

(73) Assignee: Futurewei Technologies, Inc., Plano, TX (US)

(*) Notice: Subject to any disclaimer, the term of this patent is extended or adjusted under 35 U.S.C. 154(b) by 422 days.

(21) Appl. No.: 13/324,056

(22) Filed: Dec. 13, 2011

(65) Prior Publication Data
US 2013/0151242 A1 Jun. 13, 2013

(51) Int. Cl.
*G10L 19/00* (2013.01)

(52) U.S. Cl.
USPC ............ 704/500; 704/233; 370/263; 370/268

(58) Field of Classification Search
USPC ........................................................ 704/500
See application file for complete search history.

(56) References Cited

U.S. PATENT DOCUMENTS

| | | | |
|---|---|---|---|
| 6,418,125 B1 * | 7/2002 | Oran ............................ | 370/266 |
| 7,328,150 B2 * | 2/2008 | Chen et al. .................... | 704/219 |
| 8,645,145 B2 * | 2/2014 | Subbaraman et al. ........ | 704/500 |
| 2009/0094026 A1 | 4/2009 | Cao et al. | |
| 2010/0268541 A1 | 10/2010 | Li | |
| 2011/0261150 A1 * | 10/2011 | Goyal et al. ............... | 348/14.09 |

FOREIGN PATENT DOCUMENTS

| CN | 101340545 A | 1/2009 |
|---|---|---|
| CN | 101506875 A | 8/2009 |
| EP | 1113657 A2 | 7/2001 |
| EP | 2216941 A1 | 8/2010 |
| JP | 2004364034 A | 12/2004 |

OTHER PUBLICATIONS

Foreign Communication From a Counterpart Application, PCT Application PCT/CN2012/086534, International Search Report dated Mar. 21, 2013, 6 pages.
Foreign Communication From a Counterpart Application, PCT Application PCT/CN2012/086534, Written Opinion dated Mar. 21, 2013, 4 pages.
Uyar, et al., "An Integrated Videoconferencing System for Heterogeneous Multimedia Collaboration," 7th IASTED International Conference on Internet and Multimedia Systems and Applications, 2003, 7 pages.
Kim, et al., "Frame Energy Estimation Based on Speech Codec Parameters," Proceedings of the IEEE International Conference on Acoustics, Speech, and Signal Processing, 2008, 4 pages.
Foreign Communication From a Counterpart Application, European Application No. 12857527.1, Extended European Search Report dated Aug. 18, 2014, 5 pages.

* cited by examiner

*Primary Examiner* — Daniel D Abebe
(74) *Attorney, Agent, or Firm* — Conley Rose, P.C.; Grant Rodolph; Brandt D. Howell

(57) ABSTRACT

An apparatus comprising an ingress port configured to receive a signal comprising a plurality of encoded audio signals corresponding to a plurality of sources; and a processor coupled to the ingress port and configured to calculate a parameter for each of the plurality of encoded audio signals, wherein each parameter is calculated without decoding any of the encoded audio signals, select some, but not all, of the plurality of encoded audio signals according to the parameter for each of the encoded audio signals, decode the selected signals to generate a plurality of decoded audio signals, and combine the plurality of decoded audio signals into a first audio signal.

20 Claims, 7 Drawing Sheets

METHOD TO SELECT ACTIVE CHANNELS IN AUDIO MIXING FOR MULTI-PARTY TELECONFERENCING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Packet-switched teleconferencing systems utilizing standard network communication protocols are becoming increasingly common. These systems may take advantage of the ubiquity and relatively low cost of network communication protocols to better offer teleconferencing services. However, as the popularity of teleconferencing services, and hence the number of users that may participate in a teleconference, has increased, the complexity of software and/or hardware necessary to mix together audio from many different sources to generate signals heard by the different users has increased accordingly. For example, in a system with multiple participants, one scheme may involve decoding and then mixing all the audio signals from all participants and subsequently transmitting the mixed audio signal back to the participants. One problem with this approach is that summing the audio signals from a large number of participants may cause saturation and/or distortion of the audio signal due to the digital representation, resulting in poor quality. A second problem with this approach is that audio signals from silent participants may contain only background noise, and adding signals from these participants can boost the level of background noise in the resulting mixed audio signal. Finally, a third problem with this approach is that decoding a large number of signals requires processing resources (e.g., as measured in millions of instructions per second (MIPS)) proportional to the number of users. There is thus a need to develop methods and/or systems to accommodate teleconferences involving larger groups of people by reducing complexity and/or improving speech quality.

SUMMARY

In one aspect, the invention includes an apparatus comprising an ingress port configured to receive a signal comprising a plurality of encoded audio signals corresponding to a plurality of sources; and a processor coupled to the ingress port and configured to calculate a parameter for each of the plurality of encoded audio signals, wherein each parameter is calculated without decoding any of the encoded audio signals, select some, but not all, of the plurality of encoded audio signals according to the parameter for each of the encoded audio signals, decode the selected signals to generate a plurality of decoded audio signals, and combine the plurality of decoded audio signals into a first audio signal.

In another aspect, the invention includes a method comprising receiving a plurality of audio signals corresponding to a plurality of participants in a teleconference system, wherein each audio signal is a compressed speech signal, and wherein m represents the number of audio signals, calculating a parameter for each of the plurality of audio signals, wherein each parameter is obtained without decompressing any of the plurality of audio signals, selecting the best M signals from among the plurality of audio signals according to the parameter for each of the audio signals, wherein M is a positive integer that is less than m, decompressing the best M signals to generate M uncompressed audio signals, and combining the M uncompressed audio signals into a first uncompressed audio signal.

In yet another aspect, the invention includes a network server comprising an ingress port configured to receive a signal, wherein the signal comprises m compressed audio streams, wherein m is an integer equal to at least two, a processor coupled to the ingress port and configured to calculate a parameter for each of the m compressed audio streams without requiring decompression of any audio stream, wherein each parameter provides an indication of a quality of its corresponding compressed audio stream, select M of the compressed audio streams for decompression based on the parameters, wherein M is a positive integer that is less than m, decompress the M selected compressed audio streams, combine the M selected decompressed audio stream to form a first decompressed audio stream, and compress the first decompressed audio stream to generate a first compressed audio stream, and an egress port coupled to the processor and configured to transmit the first compressed audio stream.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for audio mixing in multi-party teleconferencing that result in reduced processing, improved performance for a given number of participants, and/or an increase in the number of participants for a given audio quality. The systems and methods relate to pre-screening of an audio stream prior to mixing based on values of a predefined characteristic, such as energy, of channel signals. The systems and methods involve selecting a subset of active speech signals for decoding and mixing. The selection may be based on parameters related to each speech signal obtained based on bitstreams at the inputs to speech decoders, rather than bitstreams at the outputs (i.e., the parameters may be obtained without decoding any speech signals). The processing power needed to implement the systems and/or methods may thus be reduced because a full audio decoding from signals from all participants is not required.

Figure 1:
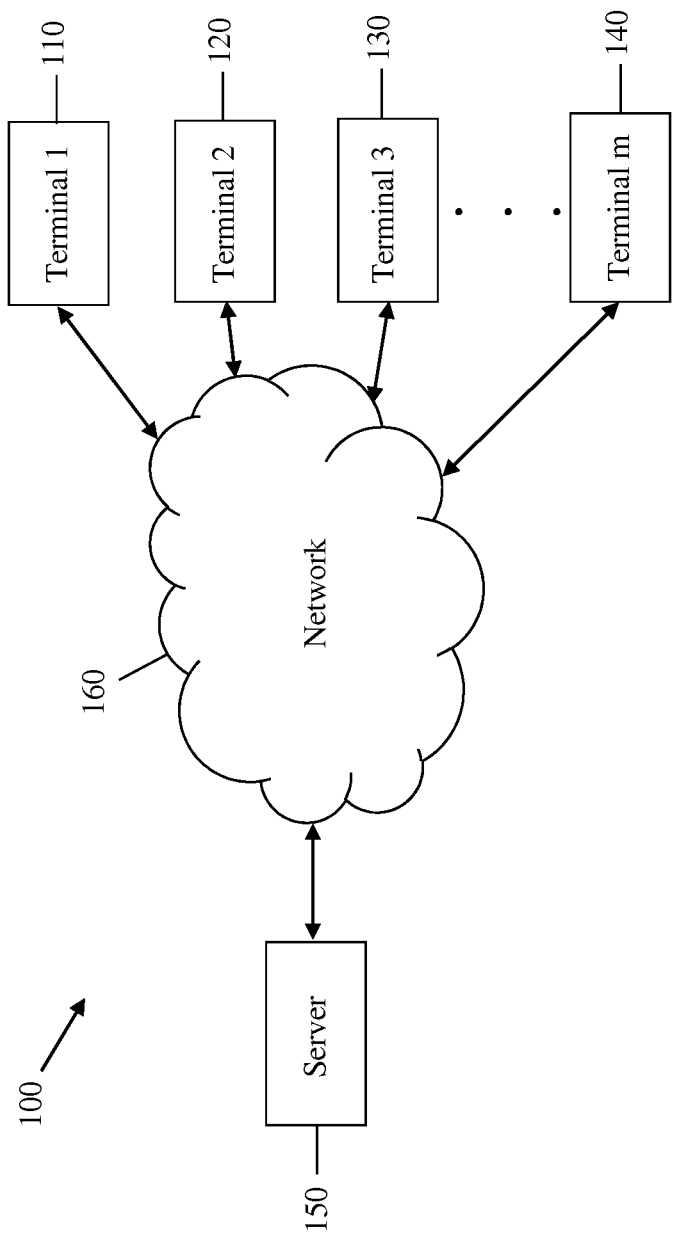
FIG. 1 is a schematic diagram of an embodiment of a teleconference architecture.

A schematic diagram of an embodiment of a teleconference architecture 100 is presented in FIG. 1. The teleconference architecture 100 may be a client-server model comprising m terminals 110-140, where m is an integer, connected to a server 150 via a network 160. The terminals 110-140 may each have at least one different user, for a total of at least m different users. The terminals 110-140 may be configured to capture speech signals from corresponding users, digitize the speech, and transmit digital speech signals over network 160 to server 150.

The server 150 may be configured to receive digital speech signals from each of the m terminals, process the speech signals, and then transmit a speech signal that may be some combination of the m input speech signals back to each of the m terminals 110-140. The transmission from server 150 may be a broadcast transmission. In this manner, server 150 facilitates a teleconference among the m terminals.

Network 160 may be any combination of routers and other processing equipment necessary to transmit speech signals from each of m terminals 110-140 to server 150. Network 160 may, for example, be the public Internet or a local Ethernet network. Terminals 110-140 may be connected to network 160 via wired or wireless links.

An alternative architecture for facilitating teleconferencing services may be a peer-to-peer architecture comprising m terminals, in which each terminal communicates directly with the other m-1 terminals via a network. In such an architecture, each terminal may be capable of receiving m-1 audio streams, one from each of the other m-1 terminals. A peer-to-peer architecture does not require a centralized server for receiving all the audio signals from the different terminals. Further, each terminal may be capable of decoding some number of the audio streams and mixing the streams into an audio output signal that can be heard by a user.

Figure 2:
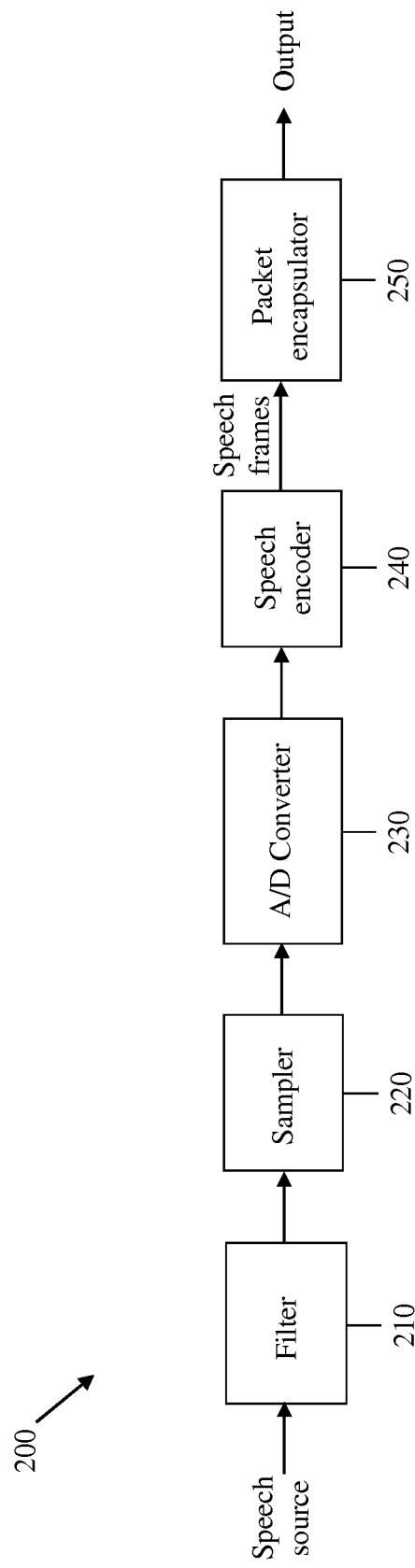
FIG. 2 is a block diagram of an embodiment of a speech encoding system.

FIG. 2 is a block diagram of an embodiment of a speech encoding system 200. The speech encoding system 200 may be implemented in one or more of the m terminals 110-140 in FIG. 1. Speech encoding system 200 comprises a filter 210, sampler 220, analog-to-digital (A/D) converter 230, speech encoder module 240, and packet encapsulator module 250 arranged as shown in FIG. 2. The speech encoding system 200 is but one example of a speech encoding system and is used for illustrative purposes.

A speech source signal is first generated, e.g., from a microphone, which converts sound waves to electrical signals. Filter 210 may be an analog low-pass filter intended to format the speech source signal for sampling and A/D conversion. Sampler 220 may sample its input signal at a rate sufficient to facilitate A/D conversion to create an analog discrete-time output signal. The output from sampler 220 may be converted to a digital signal via A/D converter 230.

Speech encoder 240 may accept an uncompressed digital speech input and produce a compressed speech output. Speech encoder 240 may, for example, be one of the variants of code-excited linear prediction (CELP) coders, such as algebraic CELP coders or an Enhanced Variable Rate Coder (EVRC), which may produce full-rate, half-rate, or eighth-rate speech. Encoding of the input bitstream may occur on a frame-by-frame basis, which generates encoded speech frames. Encoding speech may sometimes be referred to as compression, and decoding may sometimes be referred to as decompression.

Packet encapsulator module 250 may format speech frames for transmission over a network. For example, packet encapsulator module 250 may place several speech frames into one packet and add a packet header or other types of packet overhead. Other types of modules may be included in speech encoding system 200, such as a channel encoder, depending on the type of network over which signals will be transmitted.

Figure 3:
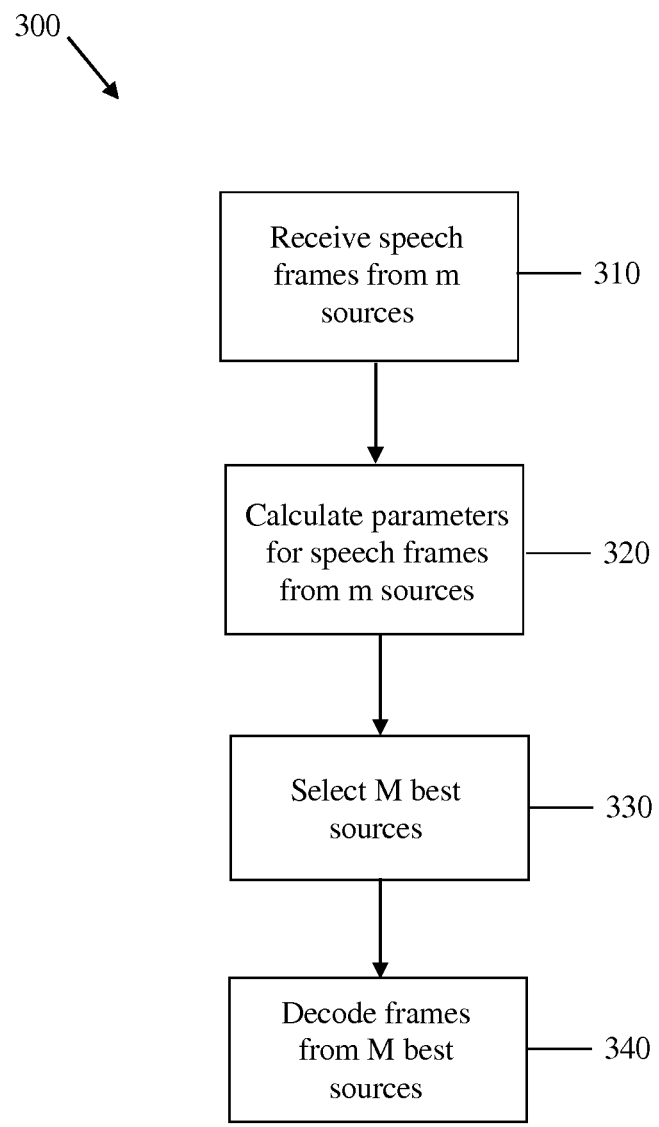
FIG. 3 is a flowchart of an embodiment of a speech source selection method.

FIG. 3 is a flowchart of an embodiment of a speech source selection method 300. The method 300 begins in step 310, in which speech frames from m audio sources may be received. Although speech from different sources may be received in a serial manner, timing information related to the speech frames may be known or transmitted along with the speech frames so that speech frames received out of order or from different sources generated at approximately the same time may be approximately aligned according to the time of transmission.

Next in step 320, parameters related to speech frames from each of m sources are calculated. As discussed above, for a given time interval one speech frame from some or all of m sources may have been transmitted, and timing information may be used to discern which frames may be aligned in time. For each of the time-aligned frames, parameters may be calculated without decoding the speech frames.

Parameters may include an estimate of signal energy in a decoded speech signal obtained without decoding the speech signal, and/or a measure of channel quality, again obtained without decoding the speech signal. With respect to an estimate of signal energy, as a first example, if CELP speech coding is used, such as an EVRC, signal energy may be estimated according to "Frame Energy Estimation Based on Speech Codec Parameters," by D.-S. Kim, B. Cao, and A. Tarraf, in *Proceedings of the IEEE International Conference on Acoustics, Speech, and Signal Processing*, 2008 ("the ICASSP reference"), which is hereby incorporated by reference, and U.S. Patent Publication No. 2009/0094026 entitled "Method of Determining an Estimated Frame Energy of a Communication" by B. Cao, D. S. Kim, and A. Tarraf ("the frame energy patent publication"), which is hereby incorporated by reference. Methods and systems for estimating signal energy are discussed in more detail below. With respect to a channel quality measure, as a second example, the channel quality measure may take into account a poorly chosen speech codec for a user (e.g., in a variable-rate coding system), a noisy audio background environment for a given speaker, and/or packet loss information. Physical channel conditions may be accounted for by estimates of signal-to-noise ratio, signal-to-interference ratio, or received signal strength indicator, such as described in the Institute of Electrical and Electronics Engineers 802.11 standards.

Next in step 330, the M best active sources may be selected based on the parameters calculated in step 320, where M is an integer that is less than m. For example, the speech corresponding to the M speech signals with the estimated largest signal energy may be selected, which may be the M "best" speech signals in this context. For example, suppose for the purposes of illustration that there are five speech frames each from a different audio source, and the speech frames have estimated signal energies E1, E2, E3, E4, and E5 for the first through fifth frames/sources, respectively. Further, suppose E2>E4>E3>E1>E5. Then speech signals corresponding to the second, fourth, and third sources may be selected. As a second example, speech corresponding to the M speech signals with the best channel quality (e.g., highest estimated signal-to-noise ratios) may be selected. In some implementations, M may be equal to three, so audio from three sources may be selected. Once the selection is made in step 320, frames from only the M best sources may be decoded.

Figure 4:
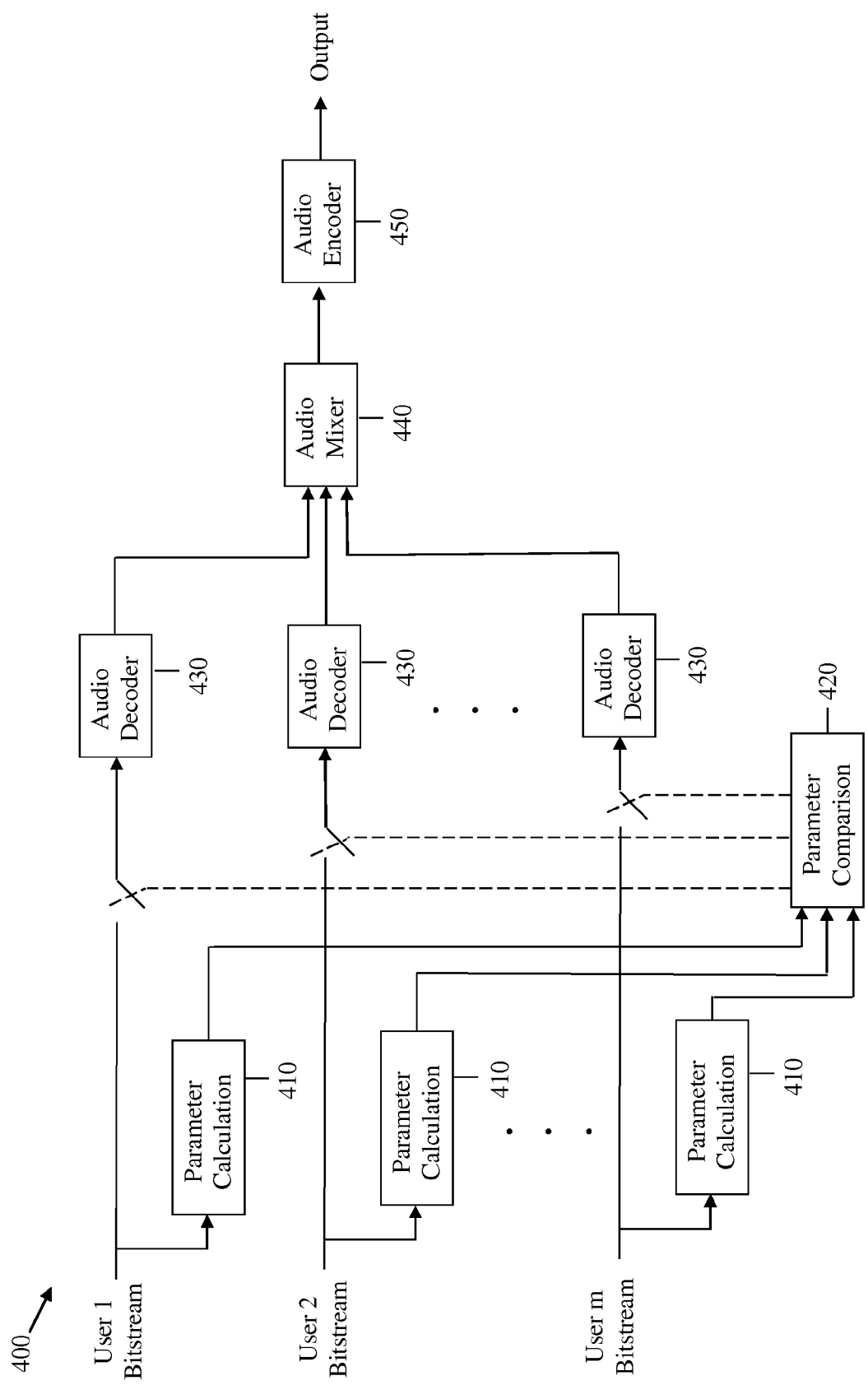
FIG. 4 is a schematic diagram of an embodiment of an audio mixing system.

FIG. 4 is a schematic diagram of an embodiment of an audio mixing system 400 that may be used to implement speech source selection method 300. Bitstreams from m users may be presented to the audio mixing system 400 for processing. The bitstreams may be obtained by serial-to-parallel conversion of a bitstream that may be received serially. For example, a bitstream carrying speech from m terminals 110-140 may be received at server 150 in a serial bitstream, and audio mixing system 400 may be implemented in server 150. Alternatively, in a peer-to-peer architecture, a variation of audio mixing system 400 may be implemented in each terminal as discussed below.

Each user bitstream may be input to a parameter calculation module 410. There may be one parameter calculation module 410 for each bitstream. A parameter calculation module 410 may calculate parameters for at least one bitstream without requiring an audio decoding to obtain the parameters.

A parameter comparison module 420 compares parameters from each of the m bitstreams and selects the M best bitstreams based on the parameters. For example, if signal energy is used as a parameter, the M best bitstreams may be determined according to the M largest signal energy levels. The parameter comparison module 420 controls which M of the m bitstreams may be presented to audio decoders 430 according to the comparison. In FIG. 4, for example, parameter comparison module 420 is shown as controlling one switch per bitstream. Parameter comparison module 420 may select M switches to turn on so that M bitstreams may be presented to corresponding audio decoders 430. An audio decoder 430 converts an encoded bitstream to a decoded waveform. For example, an audio decoder 430 may perform the inverse of the encoding performed by speech encoder 240 in FIG. 2.

Audio mixer 440 adds together M outputs from audio decoders 430 and passes the mixed output to audio encoder 450, which may be a speech encoder. Audio encoder 450 generates an output that may be transmitted to end users over a network in a client-server teleconference architecture. Alternatively, in a peer-to-peer network architecture terminals may not implement audio encoder 450 and may format output of audio mixer 440 to power one or more acoustic speakers for presentation to a listener.

As mentioned above, speech signals may be encoded using a CELP paradigm. If a CELP paradigm is used, signal energy may be determined as described below and used as a parameter in parameter calculation module 410 and parameter comparison module 420 in FIG. 4.

Figure 5:
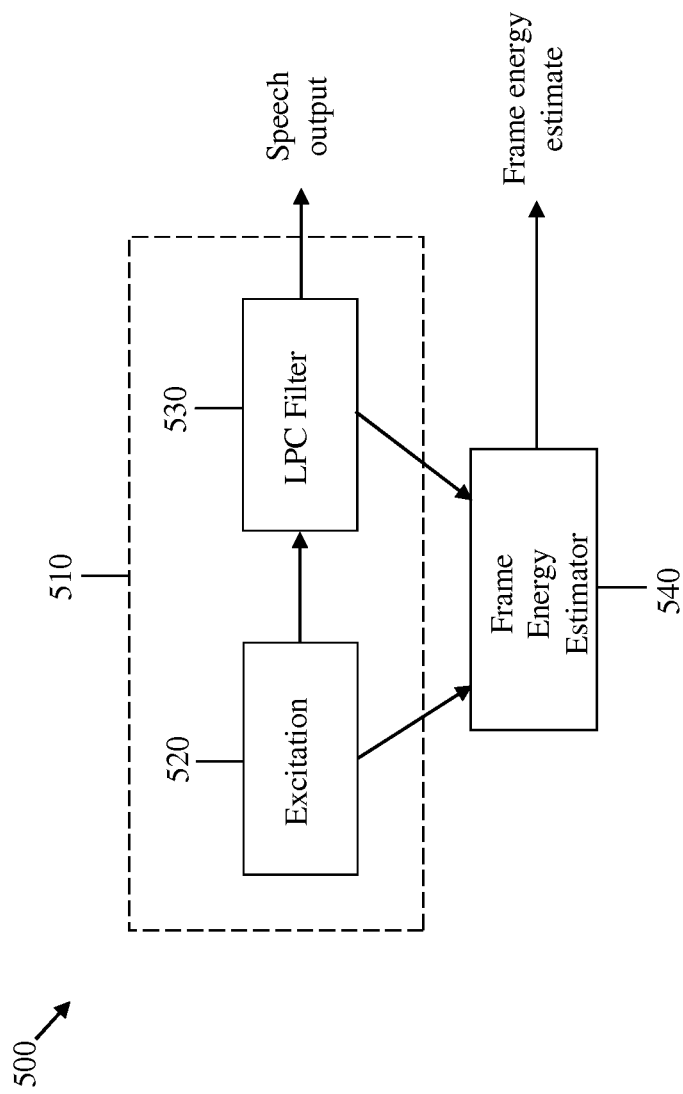
FIG. 5 is a schematic diagram of an embodiment of a code excited linear prediction (CELP) decoder and frame energy estimator.

FIG. 5 is a schematic diagram of an embodiment of a CELP decoder 510 and frame energy estimator module 540. CELP decoder 510 comprises an excitation component 520 and linear predictive coding (LPC) synthesis filter 530. The excitation portion 520 may comprise a fixed codebook, an adaptive codebook, a fixed codebook gain, and an adaptive codebook gain, as described in, for example, the ICASSP reference and the frame energy patent publication.

The frame energy estimator module 540 may employ parameters from CELP decoder 510 to estimate frame energy. See, for example, the ICASSP reference and the frame energy patent publication. For example, in an EVRC bitstream, frame-by-frame processing may be performed every 20 milliseconds, which is a frame duration. Each frame may be further divided into three subframes. The energy in the ith subframe P(i) may be approximated as $P(i)=\lambda_e(i)\lambda_h(i)$, where $\lambda_e(i)$ and $\lambda_h(i)$ are the estimated ith subframe energy of the excitation energy component and LPC synthesis filter, respectively. In a less accurate but still potentially useful implementation, the energy in the ith subframe P(i) may be estimated as equal to the energy of the excitation $\lambda_e(i)$ only.

There may be different ways of calculating $\lambda_e(i)$ depending on whether full-rate, half-rate, or eighth-rate speech is used in an EVRC. For full-rate and half-rate speech, the estimated excitation energy $\lambda_e(i)$ of the ith subframe may be approximated as $\lambda_e(i)=g_p^2(i)\lambda_e(i-1)+Cg_c^2(i)$, where $g_p(i)$ is the adaptive codebook gain, $g_c(i)$ is the fixed codebook gain, and C is a constant energy term. In one EVRC example, the value of C is set to eight. For eighth-rate speech, the estimated excitation energy $\lambda_e(i)$ of the ith subframe may be approximated as $\lambda_e(i)=r_q^2(i)$, where $r_q(i)$ is a gain term that may be obtained from a gain quantization codebook.

The energy of the LPC synthesis filter $\lambda_h(i)$ may be estimated or approximated using a reduced number of samples as $\lambda_h(i)=\Sigma_{n=0}^{K-1}h^2(i;n)$, where h(i; n) is an impulse response of the ith subframe, $h^2(i; n)$ may be determined by Line Spectrum Pair parameters, and K is a number of samples used in computing the energy of the impulse response. Satisfactory results may be obtained with K=6, for example, if using an EVRC.

Figure 6:
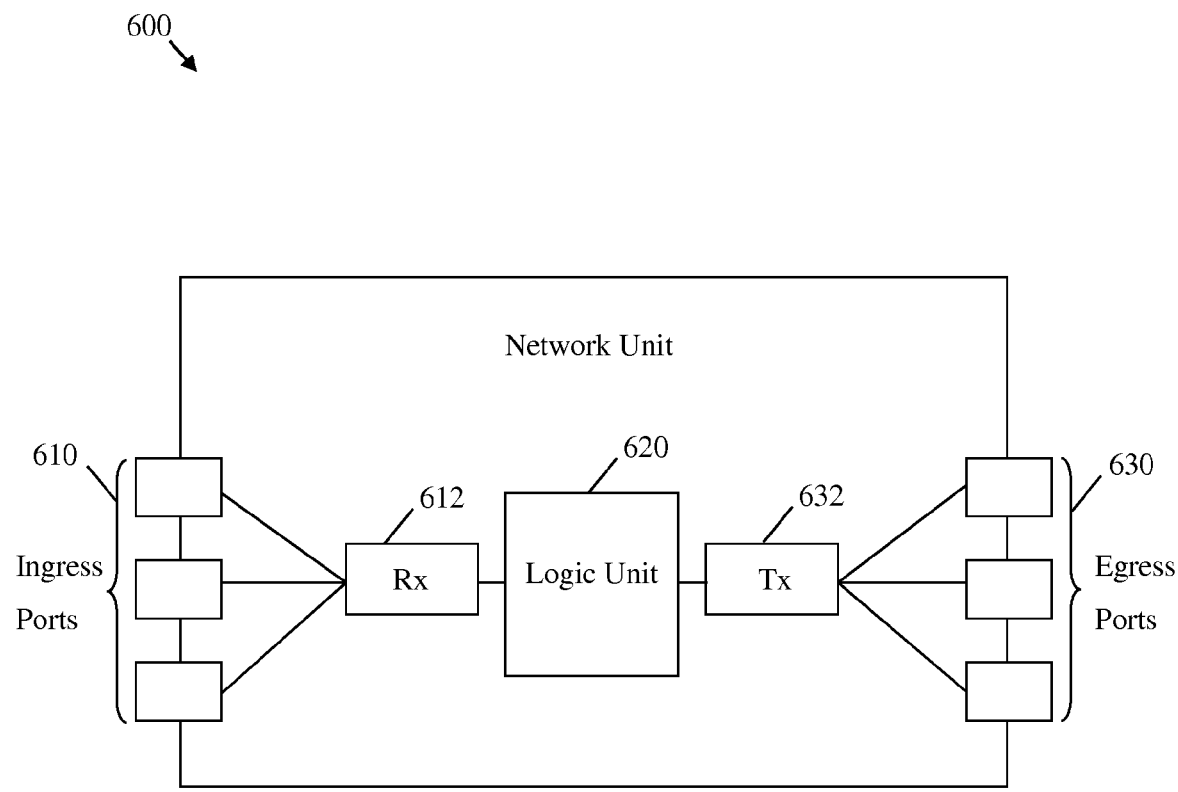
FIG. 6 is a schematic diagram of an embodiment of a network unit.

FIG. 6 illustrates an embodiment of a network unit 600. The network unit 600 may be any device that transports data through the network or exchange data with the network. For instance, the network unit 600 may be a network-associated router or server. The network unit 600 may comprise one or more ingress ports or units 610 coupled to a receiver (Rx) 612 for receiving signals and frames/data from other network components. The network unit 600 may comprise a logic unit 620 that determines which network components to which data is sent. The logic unit 620 may be implemented using hardware, software, or both. The network unit 600 may also comprise one or more egress ports or units 630 coupled to a transmitter (Tx) 632 for transmitting signals and frames/data to the other network components. The components of the network unit 600 may be arranged as shown in FIG. 6.

The network unit 600 may be located in a terminal or server, such as terminals 110-140 and server 150 in FIG. 1 or terminals in a peer-to-peer architecture, which was discussed earlier. The server 150 may, for example, receive audio signals from terminals 110-140 via one or more ingress ports 610, and may transmit information, such as audio signals, to one or more of the terminals 110-140 via one or more egress ports 630.

Figure 7:
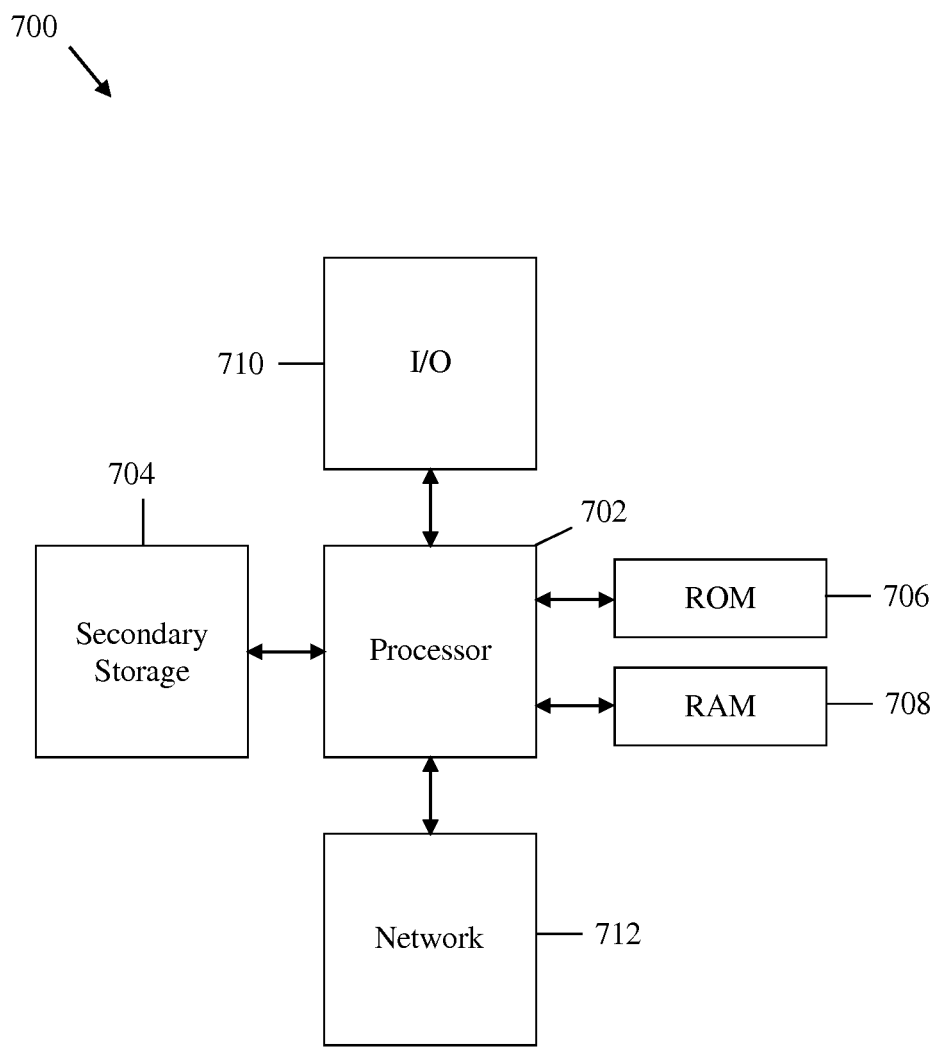
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein, such as portions of terminals or servers discussed above. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs) and/or digital signal processors (DSPs). The processor 702 may implement some or all of the methods, modules, and systems discussed previously with respect to FIGS. 3-5. For example, the processor 702 may be programmed or configured to implement some or all of the following components comprising audio mixing system 400: parameter calculation modules 410, parameter comparison module 420, audio decoders 430, audio mixer 440, or audio encoder 450.

The secondary storage 704 is typically comprised of one or more disk drives or erasable programmable ROM (EPROM) and is used for non-volatile storage of data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   an ingress port configured to receive a signal comprising a plurality of encoded audio signals corresponding to a plurality of sources; and
   a processor coupled to the ingress port and configured to:
   calculate an estimate of signal energy for each of the plurality of encoded audio signals, wherein each estimate of signal energy is calculated without decoding any of the encoded audio signals, and wherein each estimate of signal energy includes an excitation energy component;
   select some, but not all, of the plurality of encoded audio signals according to the estimate of signal energy for each of the encoded audio signals;
   decode the selected signals to generate a plurality of decoded audio signals; and combine the plurality of decoded audio signals into a first audio signal.

2. The apparatus of claim 1, wherein the estimate of signal energy is based on a product of an excitation energy component and a linear predictive coding synthesis filter energy.

3. The apparatus of claim 1, wherein the excitation energy component is based on an adaptive codebook gain and a fixed codebook gain.

4. The apparatus of claim 3, wherein the processor is further configured to encode the first audio signal to form a first encoded audio signal, wherein the apparatus further comprises an egress port coupled to the processor and configured to transmit the first encoded audio signal to a plurality of terminals, and wherein the apparatus is a server.

5. The apparatus of claim 3, wherein the apparatus is a terminal in a peer-to-peer network, and wherein the apparatus further comprises an egress port coupled to the processor and configured to transmit an encoded audio signal corresponding to only one source.

6. The apparatus of claim 1, wherein the estimate of signal energy is an estimate of channel quality.

7. The apparatus of claim 1, wherein selecting some, but not all, of the plurality of encoded audio signals comprises ranking the plurality of encoded audio signals according to the estimate of signal energy for each of the plurality of encoded audio signals.

8. The apparatus of claim 1, wherein the estimate of signal energy is determined on a frame-by-frame basis.

9. A method comprising:
receiving a plurality of audio signals corresponding to a plurality of participants in a teleconference system, wherein each audio signal is a compressed speech signal, and wherein m represents the number of audio signals;
calculating a channel quality metric for each of the plurality of audio signals, wherein each channel quality metric is obtained without decompressing any of the plurality of audio signals;
selecting the best M signals from among the plurality of audio signals according to the channel quality metric for each of the audio signals, wherein M is a positive integer that is less than m;
decompressing the best M signals to generate M uncompressed audio signals; and
combining the M uncompressed audio signals into a first uncompressed audio signal.

10. The method of claim 9, further comprising:
compressing the first uncompressed audio signal to form a first compressed audio signal; and
transmitting the first compressed audio signal.

11. The method of claim 9, wherein the channel quality metric is an examination of a chosen speech codec for one of the compressed speech signals.

12. The method of claim 9, wherein the channel quality metric is a measurement of physical audio channel conditions.

13. The method of claim 9, wherein the measurement of physical audio channel conditions comprises an estimate of signal-to-noise ratio, an estimate of signal-to-noise interference ratio, or a received signal strength indicator.

14. The method of claim 9, wherein the measurement of physical audio channel conditions is a measurement of background environment noise.

15. The method of claim 9, wherein the channel quality metric comprises packet loss information.

16. A network server comprising:
an ingress port configured to receive a signal, wherein the signal comprises m compressed audio streams, wherein m is an integer equal to at least two;
a processor coupled to the ingress port and configured to:
calculate a parameter for each of the m compressed audio streams without requiring decompression of any audio stream, wherein each parameter provides an indication of a quality of its corresponding compressed audio stream;
select M of the compressed audio streams for decompression based on the parameters, wherein M is a positive integer that is less than m;
decompress the M selected compressed audio streams;
combine the M selected decompressed audio stream to form a first decompressed audio stream; and
compress the first decompressed audio stream to generate a first compressed audio stream; and
an egress port coupled to the processor and configured to transmit the first compressed audio stream.

17. The apparatus of claim 16, wherein the parameter is an estimate of signal energy.

18. The apparatus of claim 17, wherein the estimate of signal energy is based on an excitation energy component.

19. The apparatus of claim 17, wherein the estimate of signal energy is based on a product of an excitation energy component and a linear predictive coding synthesis filter energy.

20. The apparatus of claim 19, wherein the excitation energy component is based on an adaptive codebook gain and a fixed codebook gain.

* * * * *